US011025666B1

(12) United States Patent
Han et al.

(10) Patent No.: US 11,025,666 B1
(45) Date of Patent: Jun. 1, 2021

(54) SYSTEMS AND METHODS FOR PREVENTING DECENTRALIZED MALWARE ATTACKS

(71) Applicant: Symantec Corporation, Mountain View, CA (US)

(72) Inventors: Yufei Han, Biot (FR); Yuzhe Ma, Madison, WI (US); Kevin Roundy, Culver City, CA (US); Chris Gates, Culver City, CA (US); Yun Shen, Reading (GB)

(73) Assignee: NortonLifeLock Inc., Tempe, AZ (US)

( * ) Notice: Subject to any disclaimer, the term of this patent is extended or adjusted under 35 U.S.C. 154(b) by 220 days.

(21) Appl. No.: 16/207,431

(22) Filed: Dec. 3, 2018

(51) Int. Cl.
*H04L 29/06* (2006.01)
*G06N 20/00* (2019.01)

(52) U.S. Cl.
CPC ........... *H04L 63/145* (2013.01); *G06N 20/00* (2019.01); *H04L 63/1416* (2013.01); *H04L 63/1425* (2013.01)

(58) Field of Classification Search
CPC ............... H04L 63/145; H04L 63/1416; H04L 63/1425; G06N 20/00
USPC .......................................................... 726/23
See application file for complete search history.

(56) References Cited

U.S. PATENT DOCUMENTS

| 2015/0128263 | A1* | 5/2015 | Raugas | H04L 63/1433 |
| | | | | 726/23 |
| 2017/0063912 | A1* | 3/2017 | Muddu | G06N 5/04 |
| 2018/0349986 | A1* | 12/2018 | Fidanza | G06Q 20/36 |
| 2019/0026634 | A1* | 1/2019 | Homeyer | G06Q 10/103 |
| 2019/0079526 | A1* | 3/2019 | Vallespi-Gonzalez | ...... |
| | | | | G01S 17/931 |

OTHER PUBLICATIONS

Narudin, "Evaluation of machine classifiers for mobile malware detection", Nov. 9, 2014, Springer-Verlag, pp. 343-357 (Year: 2014).*
Ma et al., "Teacher Improves Learning by Selecting a Training Subset", Proceedings of the 21st International Conference on Artificial Intelligence and Statistics (AISTATS) 2018, URL: proceedings.mlr.press/v84/ma18a/ma18a.pdf, Feb. 25, 2018, 10 pages, vol. 84, Lanzarote, Spain.
(Continued)

*Primary Examiner* — Taghi T Arani
*Assistant Examiner* — Gregory A Lane
(74) *Attorney, Agent, or Firm* — FisherBroyles, LLP

(57) ABSTRACT

The disclosed computer-implemented method for preventing decentralized malware attacks may include (i) receiving, by a computing device, node data from a group of nodes over a network, (ii) training a machine learning model by shuffling the node data to generate a set of outputs utilized for predicting malicious data, (iii) calculating a statistical deviation for each output in the set of outputs from an aggregated output for the set of outputs, and (iv) identifying, based on the statistical deviation, an anomalous output in the set of outputs that is associated with one or more of the malicious nodes, the one or more malicious nodes hosting the malicious data. Various other methods, systems, and computer-readable media are also disclosed.

20 Claims, 7 Drawing Sheets

(56) References Cited

OTHER PUBLICATIONS

Alfeld et al., "Data Poisoning Attacks against Autoregressive Models", Proceedings of the Thirtieth AAAI Conference on Artificial Intelligence (AAAI-16), URL: https://www.aaai.org/ocs/index.php/AAAI/AAAI16/paper/download/12049/11758, Feb. 21, 2016, pp. 1452-1458.

Zhang et al., "Training Set Debugging Using Trusted Items", Thirty-Second AAAI Conference on Artificial Intelligence (AAAI), URL: pages.cs.wisc.edu/~jerryzhu/pub/AAAI2018.pdf, 2018, 8 pages.

* cited by examiner

SYSTEMS AND METHODS FOR PREVENTING DECENTRALIZED MALWARE ATTACKS

BACKGROUND

Enterprise and consumer cloud computing networks are increasingly at risk of being victimized by decentralized or federated malware attacks originating from distributed customer endpoint computing devices (i.e., nodes). These attacks may include "poisoned" (e.g., malicious") data uploaded from customer nodes that have been compromised by an attacker to cloud-based platforms as modified training data for machine learning models. These machine learning models may typically utilize training data for providing third-party analytics services on cloud-based platforms such as malware/spam detection, clinical trial data analysis, etc. Once the poisoned training data has been uploaded to a cloud-based platform, the output of the machine learning models may be biased (e.g., by modifying parameters or certain data points and labels in the models) based on tactics employed by the attacker. For example, services provided by the machine learning models may be altered, based on the biased output, to enable malware to evade detection in a computer security setting.

Traditional security solutions on cloud-based platforms are typically configured to trust customer data received from distributed nodes as valid training data for machine learning models. Thus, these traditional solutions may often fail to detect poisoned training data from compromised nodes prior to the machine learning models being modified by an attacker to compromise provided security services.

SUMMARY

As will be described in greater detail below, the instant disclosure describes various systems and methods for preventing decentralized malware attacks.

In one example, a computer-implemented method for preventing decentralized malware attacks may include (i) receiving, by a computing device, node data from a group of nodes over a network, (ii) training a machine learning model by shuffling the node data to generate a set of outputs utilized for predicting malicious data, (iii) calculating a statistical deviation for each output in the set of outputs from an aggregated output for the set of outputs, and (iv) identifying, based on the statistical deviation, an anomalous output in the set of outputs that is associated with one or more of the malicious nodes, the one or more malicious nodes hosting the malicious data.

In some examples, the computer-implemented method may further include performing a security action that protects against a malware attack initiated by the malicious nodes by identifying features in the anomalous output associated with removing the malicious data.

In some embodiments, the machine learning model may be trained by performing a node-level randomized data shuffling of the node data. Additionally or alternatively, the machine learning model may be trained by (i) aggregating instances of the node data from each node in the group of nodes and (ii) performing a random sampling of the aggregated node data instances.

In some examples, the statistical deviation may be calculated by (i) determining an average for the set of outputs and (ii) calculating a deviation from the average for each of the outputs in the set of outputs. Additionally or alternatively, the statistical deviation may be calculated by determining a median for the set of outputs and (ii) calculating a deviation from the median for each of the outputs in the set of outputs.

In some embodiments, the anomalous output may include the output having the largest statistical deviation in the set of outputs. In some examples, the set of outputs may include a group of classifiers generated by the machine learning model. In some embodiments, the machine learning model may include a support vector machine model, a logistic regression model, a random forest model, and/or a deep neural network model.

In one embodiment, a system for preventing decentralized malware attacks may include at least one physical processor and physical memory that includes a group of modules and computer-executable instructions that, when executed by the physical processor, cause the physical processor to (i) receive, by a receiving module on a computing device, node data from a group of nodes over a network, (ii) train, by a training module, a machine learning model by shuffling the node data to generate a set of outputs utilized for predicting malicious data, (iii) calculate, by a calculation module, a statistical deviation for each output in the set of outputs from an aggregated output for the set of outputs, and (iv) identify, based on the statistical deviation, an anomalous output in the set of outputs that is associated with one or more of the malicious nodes, the one or more malicious nodes hosting the malicious data.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive node data from a group of nodes over a network, (ii) train a machine learning model by shuffling the node data to generate a set of outputs utilized for predicting malicious data, (iii) calculate a statistical deviation for each output in the set of outputs from an aggregated output for the set of outputs, and (iv) identify, based on the statistical deviation, an anomalous output in the set of outputs that is associated with one or more of the malicious nodes, the one or more malicious nodes hosting the malicious data.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
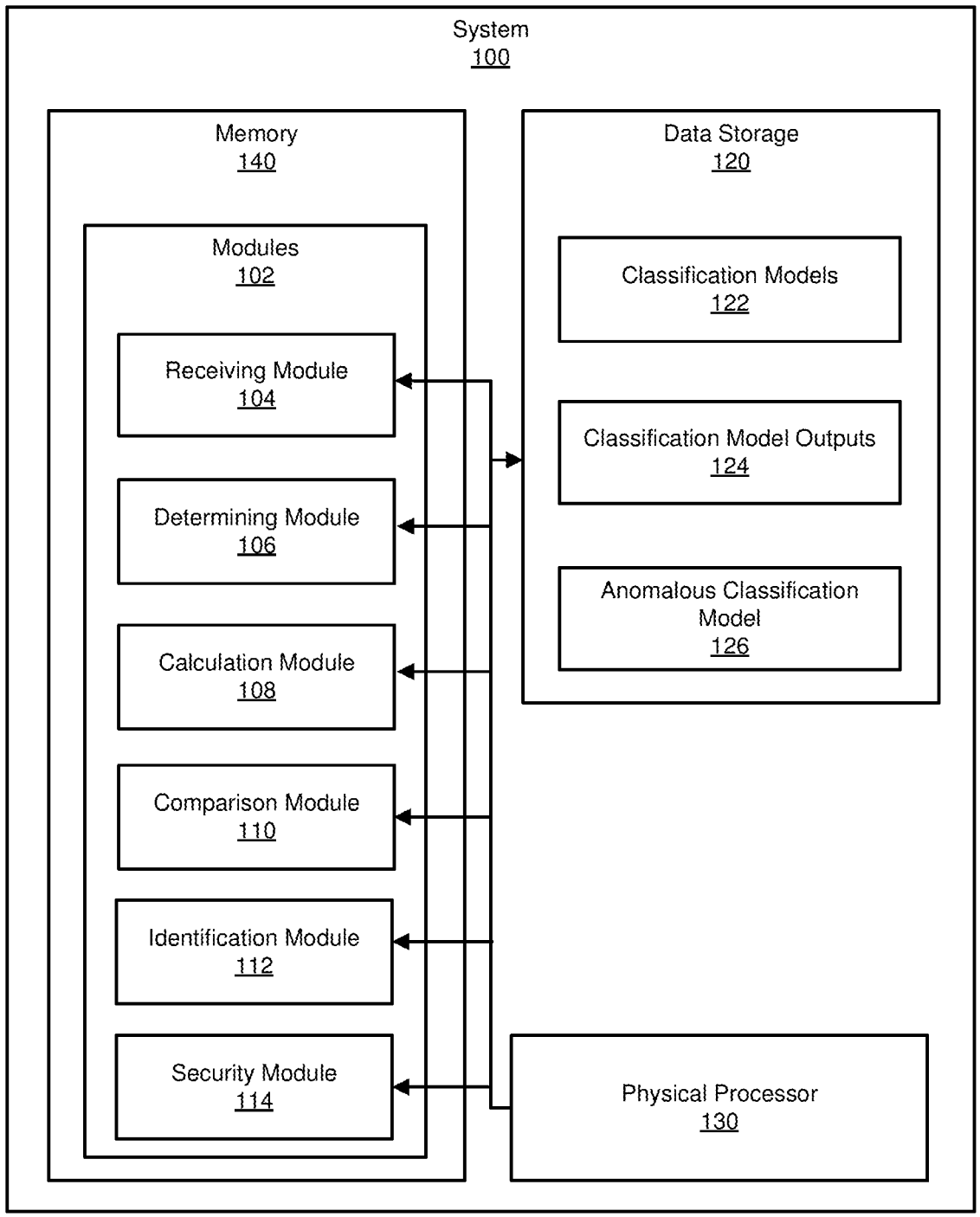
FIG. 1 is a block diagram of an example system for preventing decentralized malware attacks.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for preventing decentralized malware attacks. As will be described in greater detail below, by employing a randomized data shuffling technique on data received from distributed nodes in a computing network, the systems and methods described herein may be able to train a machine learning model by shuffling node data received from the distributed nodes and predict the presence of malicious data in one or more of the nodes by calculating a statistical deviation of the model outputs. By training the machine learning model in this way, the system and methods described herein may identify malicious nodes for infecting the computing network with malware.

In addition, the systems and methods described herein may improve the security of computing devices in a network by protecting against malware attacks initiated by malicious nodes. In some examples, the systems and methods may identify features (e.g., malware) communicated by the malicious nodes to facilitate the removal of malicious data from infected network computing devices.

Figure 2:
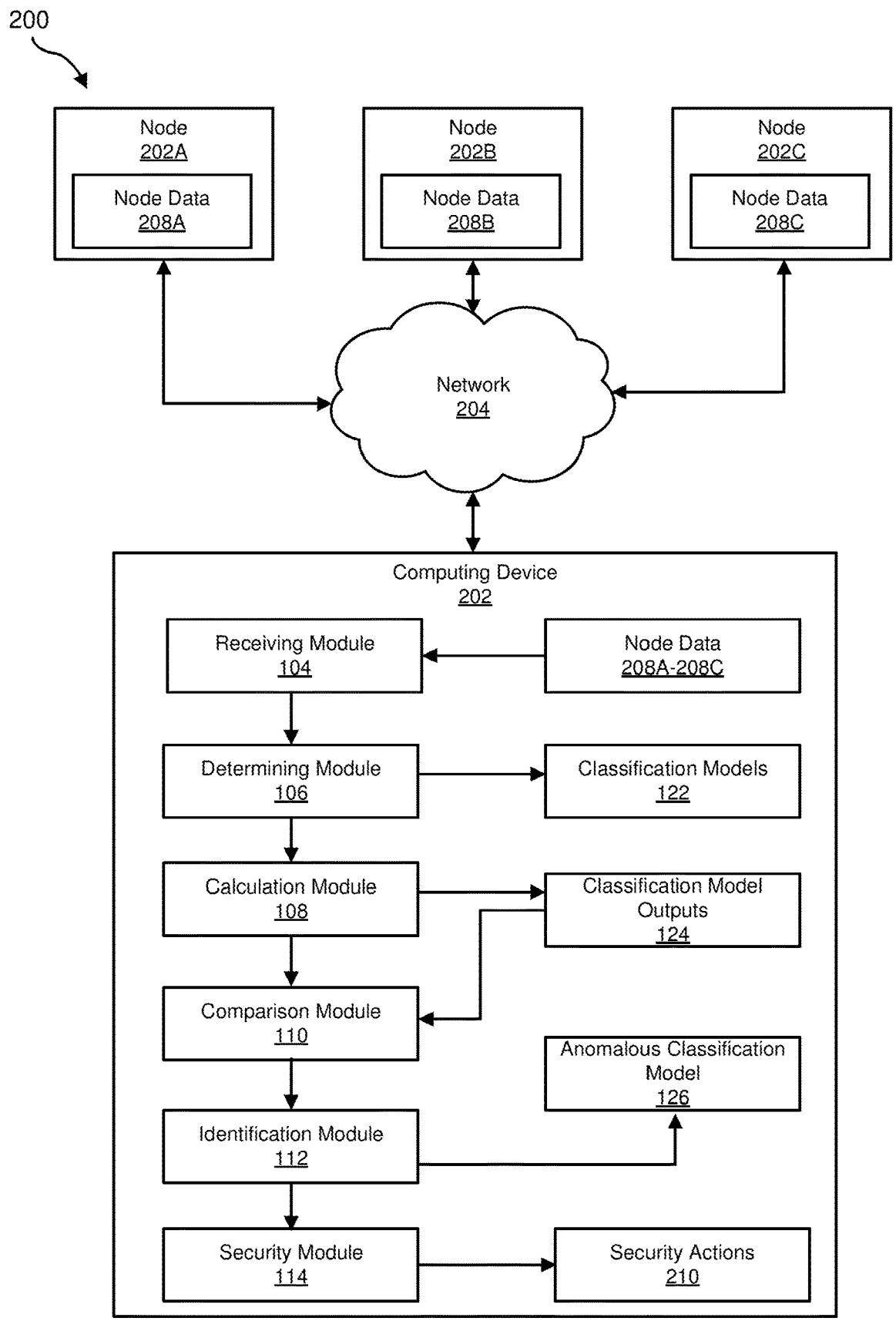
FIG. 2 is a block diagram of an additional example system for preventing decentralized malware attacks.

The following will provide, with reference to FIGS. 1-2, detailed descriptions of example systems for preventing decentralized malware attacks. Detailed descriptions of corresponding computer-implemented methods will also be provided in connection with FIG. 3. Detailed descriptions of example data shuffling methods for preventing decentralized malware attacks will also be provided in connection with FIGS. 4-5. In addition, detailed descriptions of an example computing system and network architecture capable of implementing one or more of the embodiments described herein will be provided in connection with FIGS. 6 and 7, respectively.

FIG. 1 is a block diagram of an example system 100 for preventing decentralized malware attacks. In certain embodiments, one or more of modules 102 in FIG. 1 may represent one or more software applications or programs that, when executed by a computing device, may cause the computing device to perform one or more tasks. For example, and as will be explained in greater detail below, example system 100 may include a receiving module 104 that receives node data from multiple nodes over a network. Example system 100 may additionally include a training module 106 that trains a machine learning model by shuffling the node data to generate a set of outputs utilized for predicting malicious data. Example system 100 may also include a calculation module 108 that calculates a statistical deviation for each output in the set of outputs from an aggregated output for the set of outputs. Example system 100 may additionally include an identification module 110 that identifies, based on the statistical deviation, an anomalous output in the set of outputs that is associated with one or more malicious nodes in the group of nodes, the one or more malicious nodes hosting the malicious data. Example system 100 may also include a security module 112 that performs a security action protecting against a malware attack initiated by the malicious nodes by identifying features in the anomalous output associated with removing the malicious data. Although illustrated as separate elements, one or more of modules 102 in FIG. 1 may represent portions of a single module or application.

In some examples, and as will be described in greater detail below, one or more of modules 102 may represent modules stored and configured to run on one or more computing devices, such as the devices illustrated in FIG. 2 (e.g., computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate preventing decentralized malware attacks. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store a machine learning model 122. Data storage 120 may also machine learning model outputs 124 and anomalous output 126 (which may be derived from machine learning model outputs 124).

Example system 100 in FIG. 1 may be implemented in a variety of ways. For example, all or a portion of example system 100 may represent portions of example system 200 in FIG. 2. As shown in FIG. 2, system 200 may include a computing device 202 in communication with nodes 206A-206C via a network 204. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to prevent decentralized malware attacks in a computing network.

For example, receiving module 104 may receive node data 208A, 208B, and 208C (i.e., node data 208A-208C from nodes 206A, 206B, and 206C, respectively. Next, training module 106 may train machine learning model 122 to generate machine learning model outputs 124. Then, calculation module 108 may calculate an aggregated output from machine learning model outputs 124 and identification module 110 may identify anomalous output 126 from the aggregated output. Finally, security module 112 may perform one or more security actions 210 protects against a malware attack initiated by malicious nodes from among nodes 206A-206C.

Computing device 202 generally represents any type or form of computing device capable of reading computer-executable instructions. In some examples, computing device 202 may be a cloud computing server providing services (e.g., malware/spam detection, clinical trial data analysis, etc.) to one or more nodes (e.g., nodes 206A-206C) utilizing a machine learning models. Additional examples of computing device 202 include, without limitation, application servers, web servers, storage servers, and/or database servers configured to run certain software applications and/or provide various security, web, storage, and/or database services. Although illustrated as a single entity in FIG. 2, computing device 202 may include and/or represent a plurality of servers that work and/or operate in conjunction with one another.

Nodes 206A-206C generally represent any type or form of computing device capable of reading computer-executable instructions. In some embodiments, nodes 206A-206C may represent endpoint devices in a cloud computing network for uploading data utilized in training machine learning models on a cloud computing server providing various network services (e.g., malware/spam detection, clinical trial data analysis, etc.). Additional examples of nodes 206A-206C include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202 and nodes 206A-206C. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
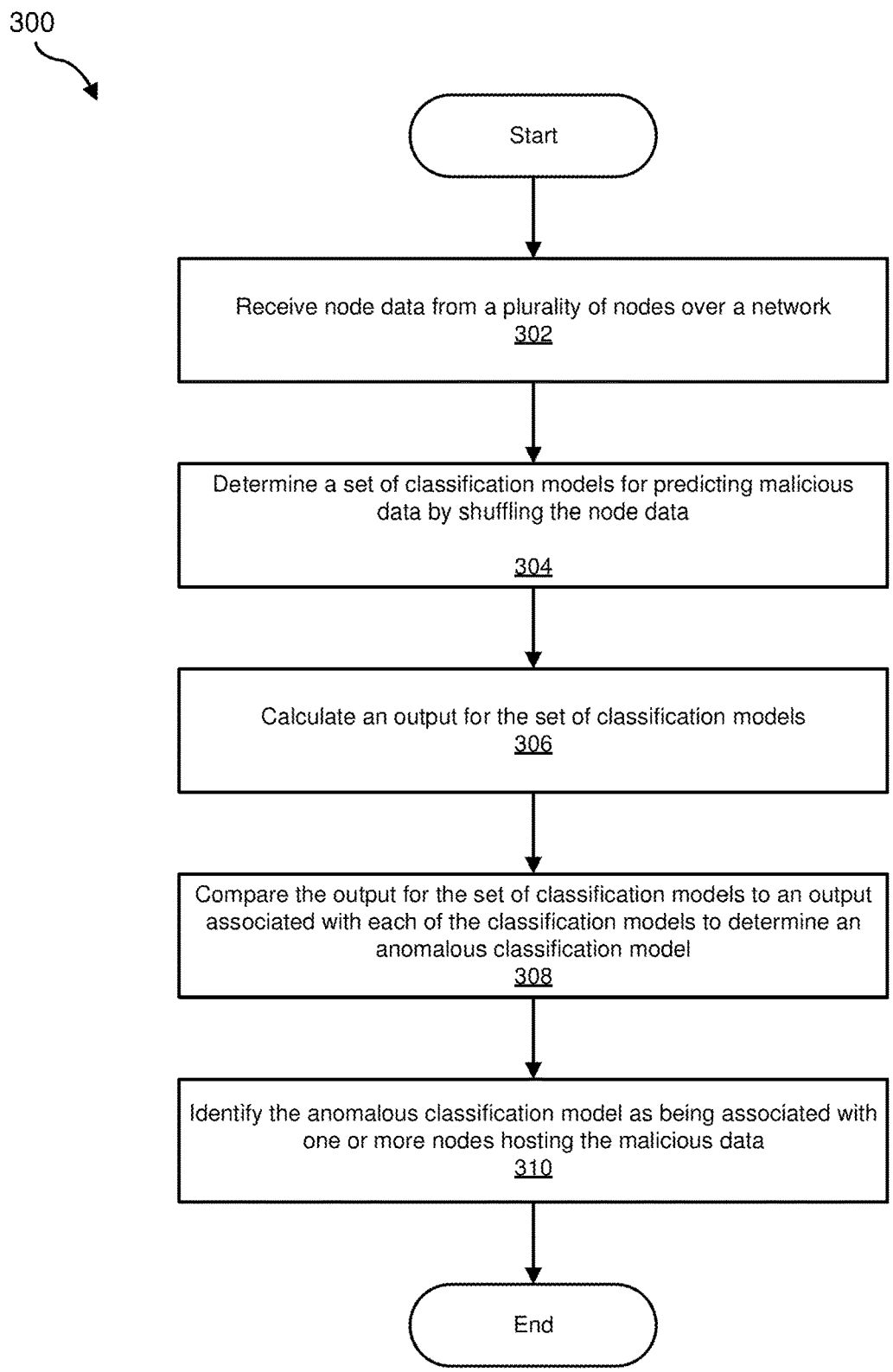
FIG. 3 is a flow diagram of an example method for preventing decentralized malware attacks.

FIG. 3 is a flow diagram of an example computer-implemented method 300 for preventing decentralized malware attacks. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive node data from a plurality of nodes over a network. For example, receiving module 104 may, as part of computing device 202 in FIG. 2, receive node data 208A-208C from each of nodes 2026A-206C respectively, over network 204.

Receiving module 104 may receive node data 208A-208C in a variety of ways. In some examples, receiving module 104 may receive node data 208A-208C as data uploaded to computing device 202, from nodes 206A-206C, for machine learning model 122. In one example, machine learning model 122 may be configured to utilize data received from multiple sources (e.g., nodes 206A-206C) as training inputs in association with providing third-party analytics services (e.g., malware/spam detection, clinical trial data analysis, etc.) on a cloud-based platform.

At step 304, one or more of the systems described herein may train a machine learning model by shuffling the node data to generate a set of outputs utilized for predicting malicious data. For example, training module 106 may, as part of computing device 202 in FIG. 2, train machine learning model 122 to generate machine learning model outputs 124 that may be utilized for predicting malicious data in one or more nodes 206A-206C.

The term "machine learning model," as used herein, generally refers to utilizing statistical techniques to provide computer systems the ability to "learn" (e.g., progressively improve performance on a specific task) from data, without being explicitly programmed. In some examples, machine learning models may utilize ensemble learning methods for classification, regression, and other tasks for generating one or more predictive outputs (e.g., classifiers) based on provided input data. Example machine learning models may include, without limitation, support vector machine models, logistic regression models, random forest models, and deep neural network (DNN) models.

Training module 106 may train machine learning model 122 in a variety of ways. In some examples, training module 106 may be configured to perform a node-level randomized data shuffling of node data 208A-208C as described in greater detail below with respect to FIG. 4. Additionally or alternatively, training module 106 may be configured to aggregate instances of node data 208A-208C and then perform a random sampling of the aggregated node data instances, as will be described in greater detail below with respect to FIG. 5.

Figure 4:
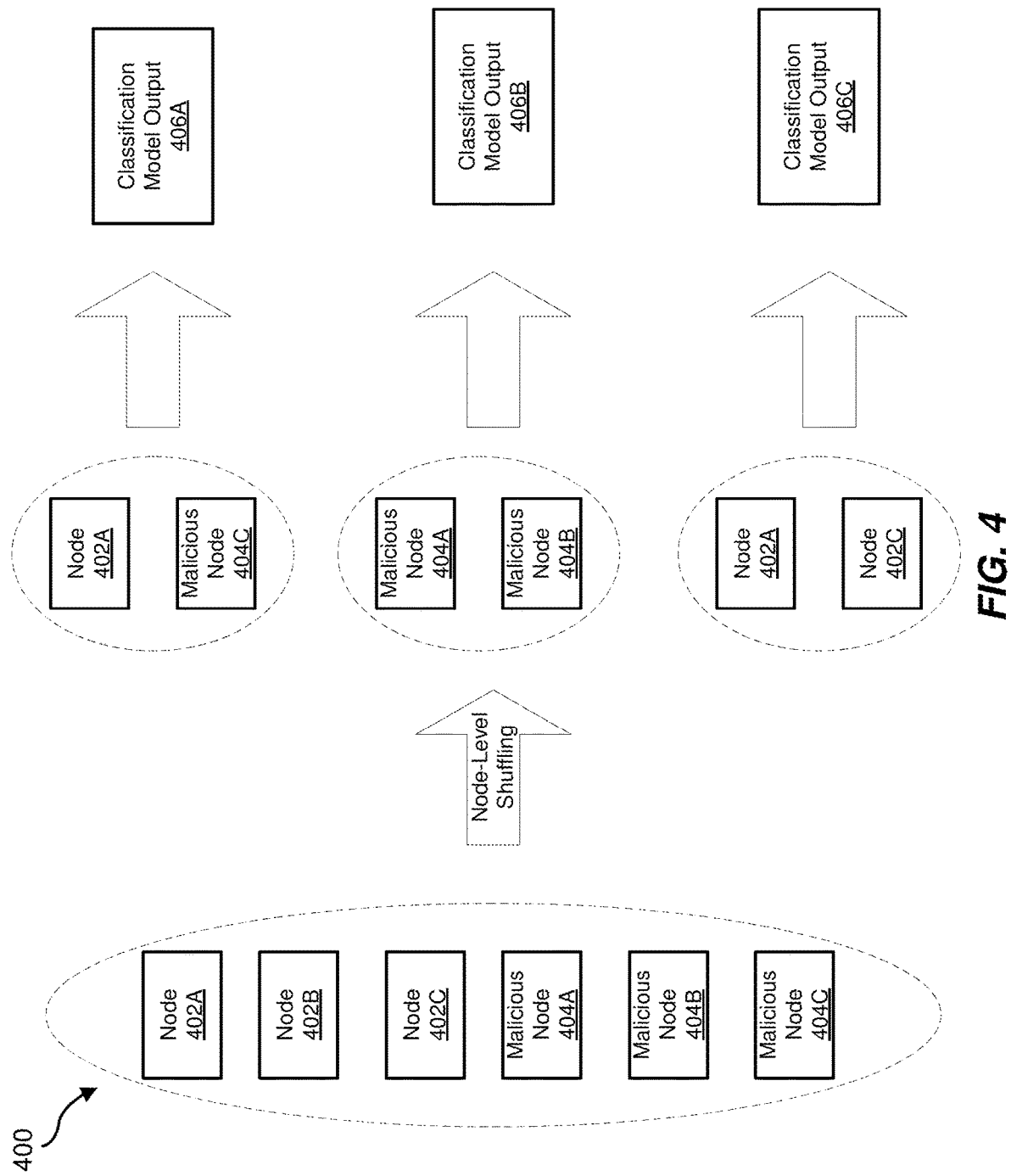
FIG. 4 is a block diagram of an example data shuffling method for preventing decentralized malware attacks.

Turning now to FIG. 4, a node-level randomized data shuffling method 400 is shown. In some examples, method 400 may include a set of non-malicious nodes 402A, 402B, 402C, 402D and a set of malicious nodes 404A, 404B. Shuffling method 400 may further include performing a randomized shuffling of nodes 402A-402D and 404A-404B to generate multiple node groups including a first group comprising node 402A and node 404D, a second group comprising malicious node 404A and malicious node 404B, and a third group comprising node 402B and node 402C. In some embodiments, the node-level randomized shuffling may be performed as follows: (1) Identify data from each node as D1, D2, D3, D4 . . . DN, (2) Shuffle $\{D\_\{i\}\}$ and chose K samples of the node data for training to build a classifier $M\_\{k\}$, and (3) Repeat step (2) for P times and derive P classifier $M\_(1)$, $M\_2$, $M\_3$, . . . $M\_\{P\}$. The groups of nodes may represent a set of outputs from shuffling method 400 such that the first group of nodes comprises a machine learning model output 406A, the second group of nodes comprises a machine learning model output 406B, and the third group of nodes comprises a machine learning model output 406C. In some examples, the set of outputs may be determined from a decision made by machine learning model 122 based on average-based voting.

Figure 5:
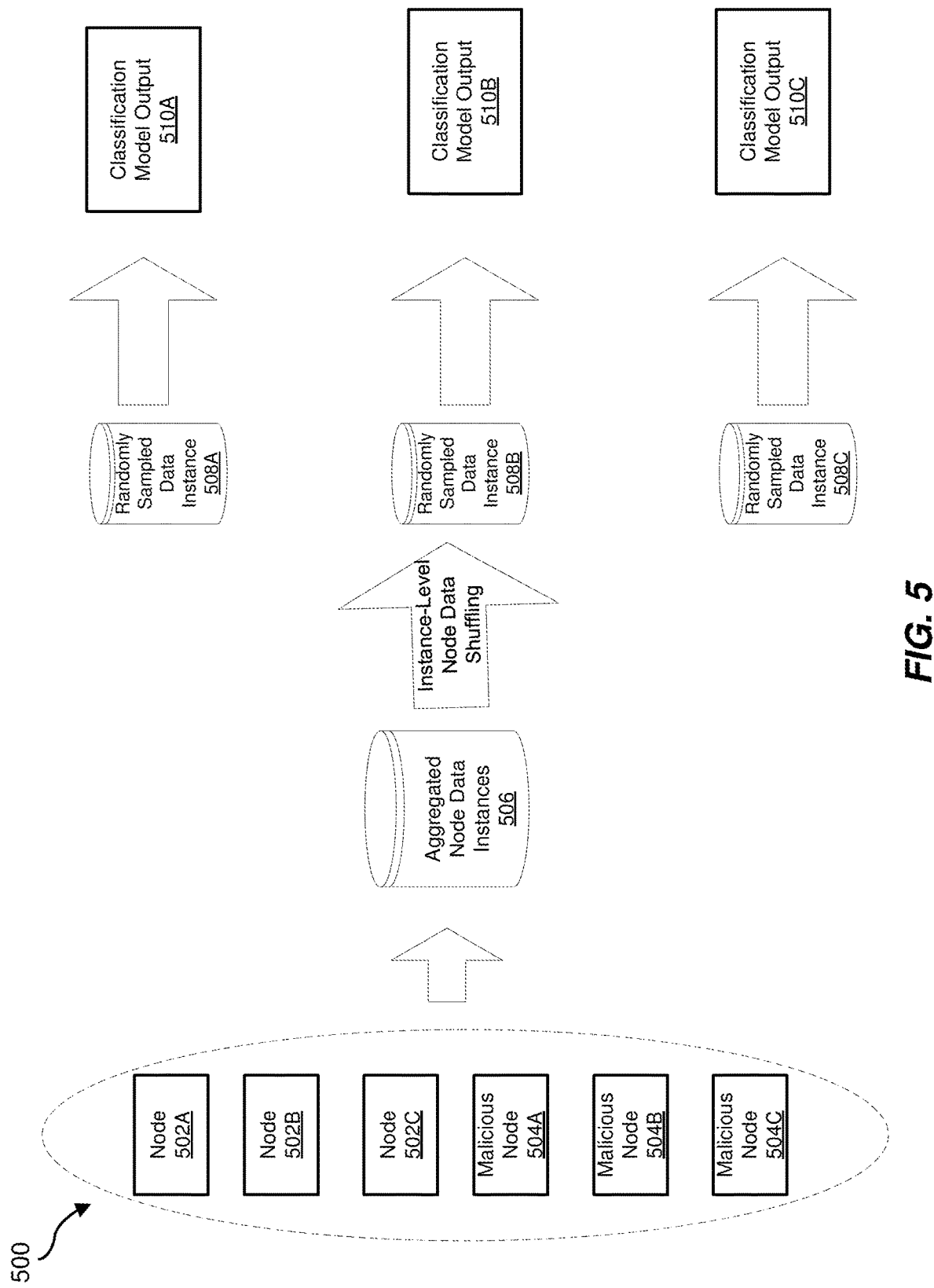
FIG. 5 is a block diagram of an additional example data shuffling method for preventing decentralized malware attacks.

Turning now to FIG. 5, an instance-level randomized data shuffling method 500 is shown. In some examples, method 500 may include a set of non-malicious nodes 502A, 502B, 502C, 502D and a set of malicious nodes 504A, 504B. Shuffling method 500 may further include aggregating data from nodes 502A-502D and 504A-504B as data instances and shuffling the data instances to generate groups of randomly sampled data instances 508A, 508B, and 508C. The groups of data instances may represent a set of outputs from shuffling method 500 such that the first group of data instances comprises a machine learning model output 510A, the second group of data instances comprises a machine learning model output 5106, and the third group of data instances comprises a machine learning model output 510C. In some examples, the set of outputs may be generated by bootstrapping the aggregated data instances as training data to derive Q different subsets. With each data subset, a classifier may be built independently thereby enabling the construction of an ensemble of component classifiers (e.g., machine learning model outputs). In some examples, the set of outputs may be determined from a decision made by machine learning model 122 based on average-based voting.

Returning to FIG. 3, at step 306, one or more of the systems described herein may calculate a statistical deviation for each output in the set of outputs generated at step 304 from an aggregation of the set of outputs. For example, calculation module 108 may, as part of computing device 202 in FIG. 2, calculate a statistical deviation for each of machine learning model outputs 124 from an aggregated total of machine learning model outputs 124. In some examples, the aggregation of machine learning model outputs 124 include a sum, weighted sum, functional mapping, and or any other method of combining machine learning model outputs 124.

Calculation module 108 may calculate the statistical deviation in a variety of ways. In some examples, calculation module 108 may be configured calculate the statistical deviation by determining an average for machine learning model outputs 124 and then calculating a deviation from the average for each of the individual machine learning model outputs 124. For example, calculation module 108 may average machine learning model outputs 406A-406C in FIG. 4 and then determine a deviation from the calculated average for each of machine learning model outputs 406A, 406B, and 406C. In some examples, the deviation from the average may be difference value associated with classifiers representing each of machine learning model outputs 406A-406C. Additionally or alternatively, calculation module 108 may be configured calculate the statistical deviation by determining a median for machine learning model outputs 124 and then calculating a deviation from the median for each of the individual machine learning model outputs 124. For example, calculation module 108 may determine the median output for machine learning model outputs 510A-510C in FIG. 5 and then determine a deviation from the median for each of machine learning model outputs 510A, 510B, and 510C. In some examples, the deviation from the median may be a difference value associated with classifiers representing each of machine learning model outputs 510A-510C.

At step 308, one or more of the systems described herein may identify, based on the statistical deviation calculated at step 306, an anomalous output in the set of outputs as being associated with one or more malicious nodes hosting malicious data. For example, identification module 110 may, as part of computing device 202 in FIG. 2, identify anomalous output 126 as an output in machine learning model outputs 124. In some examples, anomalous output 126 may be associated with one or more malicious nodes (e.g., one or more of nodes 206A-206C determined to be malicious based on the statistical deviation calculated by calculation module 108) hosting malicious node data.

Identification module 110 may identify anomalous output 126 in a variety of ways. In some examples, identification module may identify anomalous output 126 as an output in a set of machine learning model outputs 124 having the largest deviation from the calculated average for each of machine learning model outputs 122. For example, identification module may identify machine learning model output 406B which, as shown in FIG. 4 is associated with malicious nodes 404A and 404B, as anomalous output 126 based on the presence of malicious nodes 404A and 404B resulting in a deviation from a calculated average of machine learning model outputs 406A-406C which are associated with a majority of non-malicious nodes. In other examples, identification module may identify anomalous output 126 as an output in a set of machine learning model outputs 124 having the largest deviation from the calculated median for each of machine learning model outputs 124. For example, identification module 110 may identify machine learning model output 510C which of FIG. 5 as being associated with malicious nodes and thus representing anomalous output 126 based on the presence of malicious nodes 504A and 504B resulting in a deviation from a calculated median of machine learning model outputs 510A-510C which are associated with a majority of non-malicious nodes. In some examples, identification module 110 may be configured to "trace back" from anomalous output 126 to identify the malicious nodes (e.g., from among nodes 202A-202C) responsible for communicating the malicious data.

In some examples, upon identifying anomalous output 126, security module 112 may, as part of computing device 202 in FIG. 2, determine that anomalous output 126 is likely to be impacted by malicious data and remove anomalous output 126. In some examples, upon identifying anomalous output 126, security module 112 may compare a statistical summary of features in anomalous output 126 representing a corrupted group of nodes and the remaining machine learning model outputs 124 representing a normal group of nodes. The statistical summary may include a union of a variety of statistics including, without limitation, mean, covariance, n-th order statistical moments, and/or a histogram of feature values. The comparison between the identified corrupted group and the normal group may unveil how the feature values of a corresponding feature dimension in the corrupted group are crafted by malicious data. In some examples, data from the comparison (e.g., observed changes in the feature values) may be conveyed to data analysts so that they may better understand better how a malware (e.g., data poisoning) attack is conducted by the malicious data. For example, based on the comparison data and the identified malicious nodes providing the malicious data, actions such as hardening the malicious nodes may be taken to prevent malware attacks.

As explained in connection with method 300 above, the systems and methods described herein provide for defending against decentralized data poisoning threats in a cloud computing network. By utilizing a randomized ensemble machine learning based defense strategy, the systems described herein may create a derived and robust machine learning based prediction model given maliciously crafted data. The machine learning model may further be able to simultaneously identify compromised malicious nodes in the computing network. The randomized ensemble machine learning based defense strategy may include a node-level randomized data shuffling-based defense and/or an instance-level randomized data shuffling-based defense. The node-level defense may include an ensemble prediction model that performs node-level data shuffling and sampling to generate multiple outputs which are then aggregated for identifying malicious nodes via a robust statistical estimator, the identified malicious nodes corresponding to compromised nodes hosting malicious data in the computing network. The instance-level defense may include random sampling aggregated data instances from all nodes in a computing network to generate multiple outputs which are then aggregated for identifying malicious nodes via a robust statistical estimator, the identified malicious nodes corresponding to compromised nodes hosting malicious data in the computing network.

Figure 6:
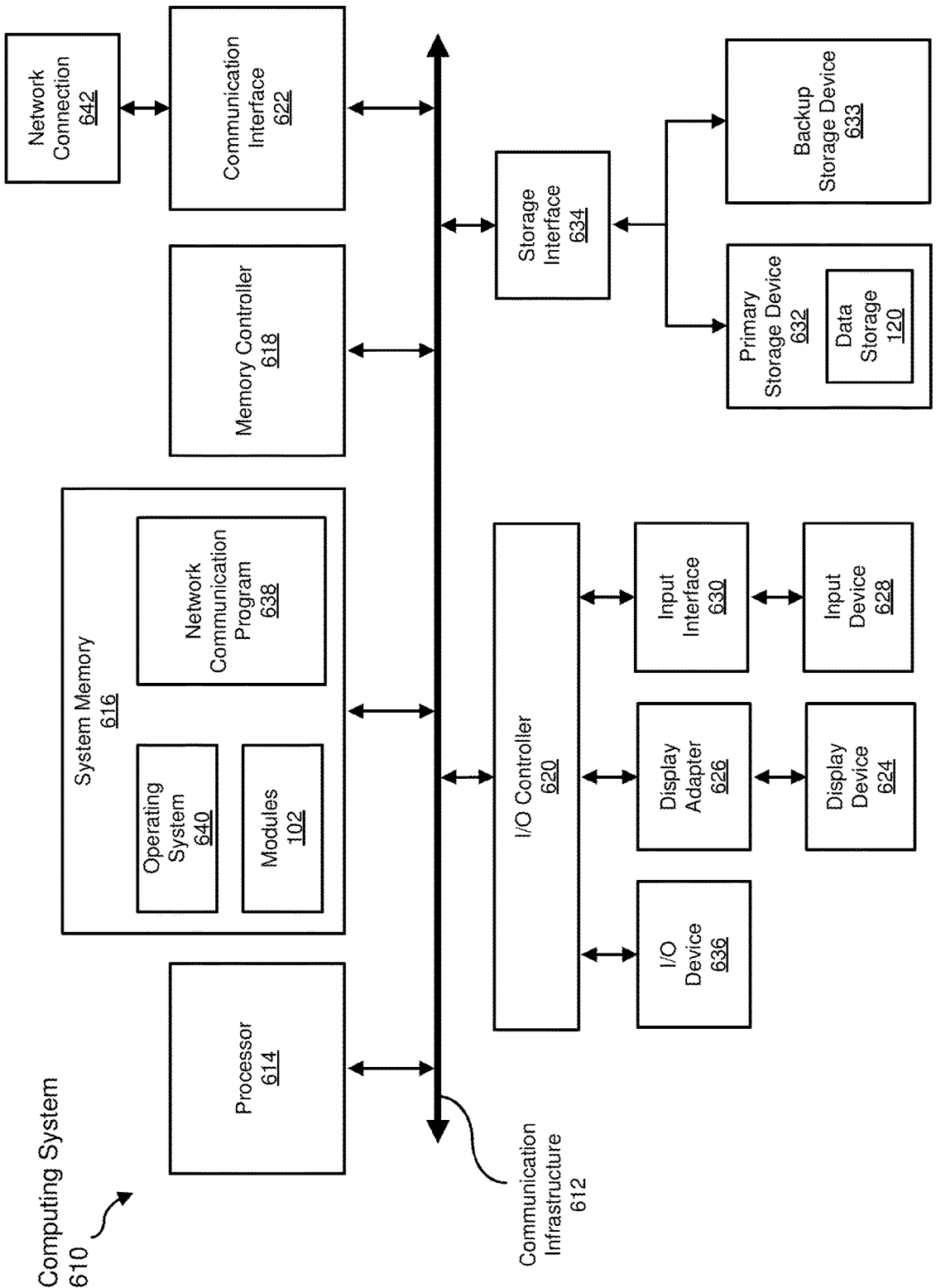
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
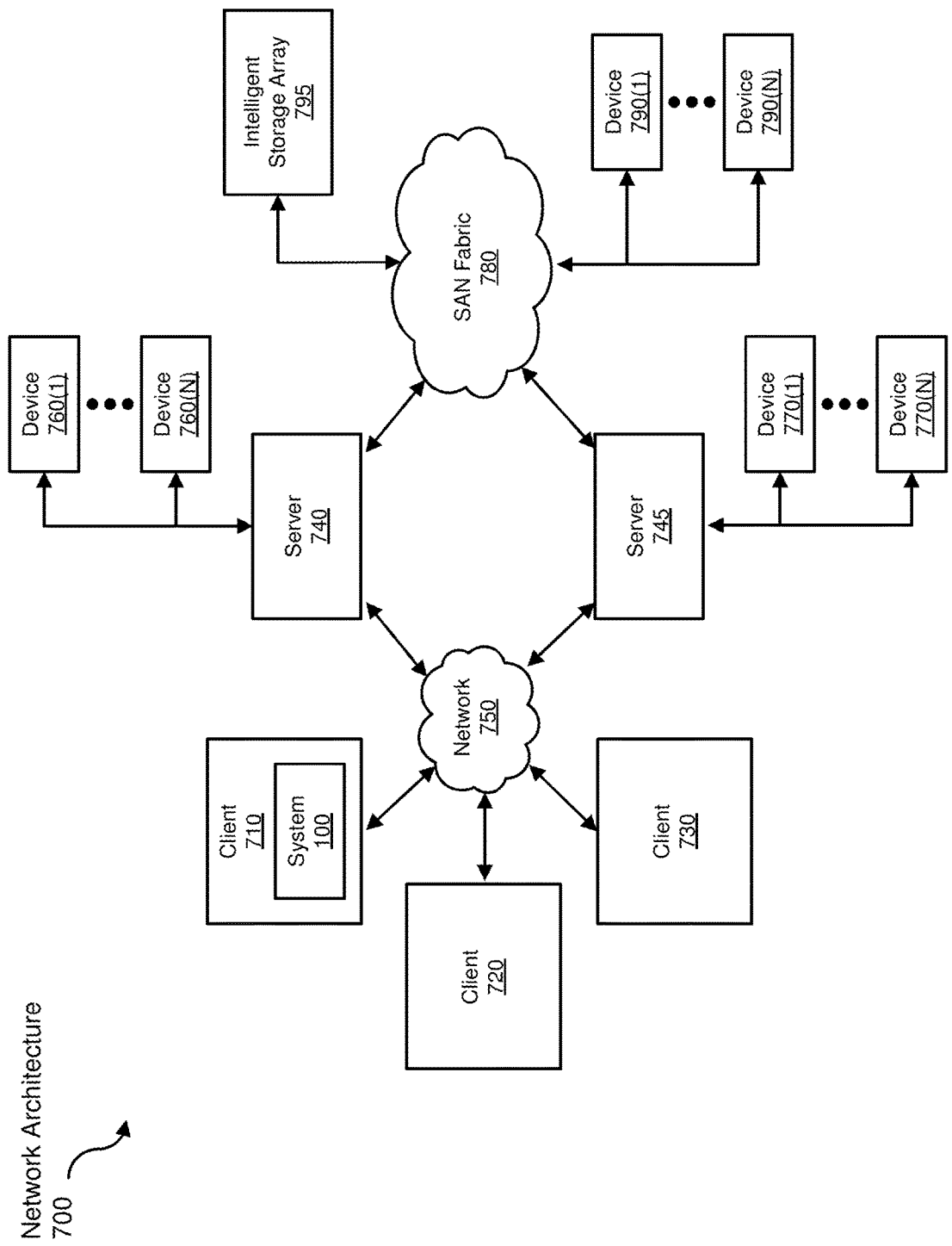
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for preventing decentralized malware attacks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed.

The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing decentralized malware attacks, at least a portion of the method being performed by a computing device comprising at least one processor, the method comprising:
receiving, by the computing device, node data from a plurality of nodes over a network; training, by the computing device, a machine learning model by shuffling the node data to generate a set of outputs utilized for predicting malicious data, wherein shuffling the node data comprises:
performing a node-level randomized data shuffling of the node data to generate a plurality of node groups comprising malicious nodes and non-malicious nodes, the node groups comprising a portion of the set of outputs: and
performing, following the node-level randomized data shuffling, an instance-level randomized data shuffling by aggregating the node data as data instances and shuffling the data instances to generate groups of randomly sampled data instances of the malicious nodes and the non-malicious nodes, the groups of randomly sampled data instances comprising a remaining portion of the set of outputs:

calculating, by the computing device, a statistical deviation for each output in the set of outputs from an aggregated output for the set of outputs; and identifying, by the computing device and based on the statistical deviation, an anomalous output in the set of outputs that is associated with one or more of the malicious nodes, the one or more of the malicious nodes hosting the malicious data.

2. The computer-implemented method of claim 1, further comprising performing a security action that protects against a malware attack initiated by the malicious nodes by identifying features in the anomalous output associated with removing the malicious data.

3. The computer-implemented method of claim 1, wherein calculating the statistical deviation comprises:
    determining an average for the set of outputs; and
    calculating a deviation from the average for each of the outputs in the set of outputs.

4. The computer-implemented method of claim 1, wherein calculating the statistical deviation comprises:
    determining a median for the set of outputs; and
    calculating a deviation from the median for each of the outputs in the set of outputs.

5. The computer-implemented method of claim 1, wherein the anomalous output comprises the output in the set of outputs having the largest statistical deviation.

6. The computer-implemented method of claim 1, wherein the set of outputs comprises a plurality of classifiers generated by the machine learning model.

7. The computer-implemented method of claim 1, wherein the machine learning model comprises at least one of:
    a support vector machine model;
    a logistic regression model;
    a random forest model; and
    a deep neural network model.

8. A system for preventing decentralized malware attacks, the system comprising:
    at least one physical processor;
    physical memory comprising a plurality of modules and computer-executable instructions that, when executed by the physical processor, cause the physical processor to:
        receive, by a receiving module on a computing device, node data from a plurality of nodes over a network;
        train, by a training module, a machine learning model by shuffling the node data to generate a set of outputs utilized for predicting malicious data, wherein shuffling the node data comprises:
            performing a node-level randomized data shuffling of the node data to generate a plurality of node groups comprising malicious nodes and non-malicious nodes, the node groups comprising a portion of the set of outputs; and
            performing, following the node-level randomized data shuffling, an instance-level randomized data shuffling by aggregating the node data as data instances and shuffling the data instances to generate groups of randomly sampled data instances of the malicious nodes and the non-malicious nodes, the groups of randomly sampled data instances comprising a remaining portion of the set of outputs;
        calculate, by a calculation module, a statistical deviation for each output in the set of outputs from an aggregated output for the set of outputs; and
        identify, by an identification module and based on the statistical deviation, an anomalous output in the set of outputs that is associated with one or more of the malicious nodes, the one or more of the malicious nodes hosting the malicious data.

9. The system of claim 8, wherein the system further comprises a security module that performs a security action protecting against a malware attack initiated by the malicious nodes by identifying features in the anomalous output associated with removing the malicious data.

10. The system of claim 8, wherein the calculation module calculates the statistical deviation by:
    determining an average for the set of outputs; and
    calculating a deviation from the average for each of the outputs in the set of outputs.

11. The system of claim 8, wherein the calculation module calculates the statistical deviation by:
    determining a median for the set of outputs; and
    calculating a deviation from the median for each of the outputs in the set of outputs.

12. The system of claim 8, wherein the anomalous output comprises the output in the set of outputs having the largest statistical deviation.

13. The system of claim 8, wherein the set of outputs comprises a plurality of classifiers generated by the machine learning model.

14. The system of claim 8, wherein the machine learning model comprises at least one of:
    a support vector machine model;
    a logistic regression model;
    a random forest model; and
    a deep neural network model.

15. A non-transitory computer-readable medium comprising one or more computer-executable instructions that, when executed by at least one processor of a computing device, cause the computing device to:
    receive node data from a plurality of nodes over a network;
    determine a set of classification models for predicting malicious data by shuffling the node data, wherein shuffling the node data comprises:
        performing a node-level randomized data shuffling of the node data to generate a plurality of node groups comprising malicious nodes and non-malicious nodes, the node groups comprising a portion of a set of outputs utilized for predicting the malicious data; and
        performing, following the node-level randomized data shuffling, an instance-level randomized data shuffling by aggregating the node data as data instances and shuffling the data instances to generate groups of randomly sampled data instances of the malicious nodes and the non-malicious nodes, the groups of randomly sampled data instances comprising a remaining portion of the set of outputs utilized for predicting the malicious data;
    calculate an output for the set of classification models from the portion of the set of outputs and the remaining portion of the set of outputs;
    compare the output for the set of classification models to an output associated with each of the classification models to determine an anomalous classification model having an output representing a statistical deviation from the output for the set of classification models; and identify the anomalous classification model as being associated with one or more of the malicious nodes, the one or more of the malicious nodes hosting the malicious data.

16. The non-transitory computer-readable medium of claim 15, wherein the one or more computer-executable instructions further cause the computing device to perform a security action protecting against a malware attack initiated by the malicious nodes by identifying features in the anomalous output associated with removing the malicious data.

17. The computer-implemented method of claim 1, wherein each of the plurality of node groups comprises a machine learning model output.

18. The computer-implemented method of claim 1, wherein the set of outputs is determined from a decision made by the machine learning model based on average-based voting.

19. The system of claim 8, wherein each of the plurality of node groups comprises a machine learning model output.

20. The system of claim 8, wherein the set of outputs is determined from a decision made by the machine learning model based on average-based voting.

* * * * *